Patented Jan. 20, 1953

2,626,244

UNITED STATES PATENT OFFICE 2,626,244

SURFACE-ACTIVE COMPOSITION

William A. Fessler, Prince George County, Va., assignor to Allied Chemical & Dye Corporation, New York, N. Y., a corporation of New York No Drawing. Application June 12, 1948, Serial No. 32,730

12 Claims. (Cl. 252—355)

This invention relates to surface-active compositions containing as the essential component a mixture of sulfonated products derived from unsaturated organic compounds containing at least one non-aromatic

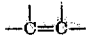

linkage (that is, a

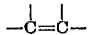

linkage which is not part of an aromatic ring). The invention relates particularly to surface-active compositions useful as wetting agents and as washing agents for wool and related fibrous material, wherein the essential surface-active agent is a mixture of organic compounds referred to herein as "nitrosation-sulfitation products."

In United States Patent 2,265,993 of December 16, 1941, to L. J. Beckham, a process is described for the production of surface-active compositions by forming an addition product of a nitrosyl halide, specifically nitrosyl chloride or nitrosyl bromide, with unsaturated compounds or mixtures thereof and reacting the resulting addition products with a water-soluble sulfite in aqueous solution. The compositions obtained by this process comprise water-soluble mixtures of sulfonated ketones, sulfonated amines, sulfonated alkylidene sulfamates, sulfonated alkyl sulfamates and bisulfite addition products of sulfonated alkalidene sulfamates. In United States Patent No. 2,336,387 of December 7, 1943, to Leland J. Beckham, the manufacture is described of certain surface-active compositions of said type from carboxyl-substituted unsaturated hydrocarbons and mixtures thereof. And in United States Patent No. 2,313,719 of March 16, 1943, to L. J. Beckham, a process is described for the production of surface-active compositions by a sulfitation procedure similar to that described in the above-mentioned patent and application, from addition products of organic compounds containing a non-aromatic

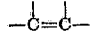

linkage with nitrogen oxides, particularly nitrogen tetroxide and nitrogen trioxide.

An object of the present invention is to provide an improved surface-active composition containing one or more nitrosation-sulfitation products of the above type as the principal constituent and having enhanced surface-active properties, as compared with the nitrosation-sulfitation product alone.

A further object of the present invention is to provide an improved surface-active composition containing one or more nitrosation-sulfitation products of the above type as the principal constituent and having enhanced wetting action, as compared with the nitrosation-sulfitation product alone.

An additional object of the present invention is to provide improved surface-active compositions containing one or more nitrosation-sulfitation products as the principal constituent and having enhanced washing action on wool and related textile fibrous material, as compared with the nitrosation-sulfitation product alone.

Other objects of the invention will in part be obvious and will in part appear hereinafter.

According to the present invention, surface-active compositions containing nitrosation-sulfitation products as the principal constituent, and having greater surface-active properties than the nitrosation-sulfitation products alone, are produced by intimately admixing with the nitrosation-sulfitation products in the form of salts (more particularly in the form of alkali metal salts and ammonium salts, and especially sodium salts), minor amounts of one or more cation-active organic nitrogen compounds having one nitrogen atom and a maximum total of 20 carbon atoms per molecule, of which a minimum of 6 and a maximum of 14 carbon atoms are contained in an open carbon-to-carbon chain radical attached to the nitrogen atom and of which a maximum of 6 additional carbon atoms are attached to the nitrogen atom. For purposes of this definition, carbon atoms forming part of a cyclic radical are counted as part of an open carbon-to-carbon chain radical if the chain contains, in addition to the cyclic radical, at least 2 other carbon atoms attached, respectively, to 2 different carbon atoms of the cyclic radical; as for example, in the case of the 6 carbon atoms of the benzene ring of an alkylbenzyl compound. I have discovered that such cation-active organic nitrogen compounds have the property of greatly increasing the wetting action and wool washing action of the nitrosation-sulfitation products in aqueous media.

The cation-active organic nitrogen compounds useful in accordance with the present invention include free amines and organic nitrogen base salts (that is, amine salts and quaternary ammonium salts) having the composition set out above. Suitable salts include the halides, sulfates, and bisulfates. Preferred quaternary ammonium salts of the above type are those in which the open carbon-to-carbon chain radical contains a minimum of 8 carbon atoms, of which 8 to 10 carbon atoms are members of the chain. (When present in a carbon-to-carbon chain, a benzene ring is counted as contributing only 4 carbon atoms to the chain, although it is counted as contributing 6 carbon atoms to the radical.) Organic nitrogen base salts especially advantageous because of their synergistic effect are the cation-active alkylbenzyl quaternary ammonium salts (e. g., halides, sulfates, bisulfates, etc.), and particularly the alkylbenzyl pyridinium salts, having 3 to 7 carbon atoms in the alkyl group, and containing a total of not less than 13 and not more than 20 carbon atoms per molecule.

Preferably the cation-active organic nitrogen compounds are employed in amounts ranging from 1 part to 10 parts by weight (on the basis of the pure compound) for each 99 to 90 parts by weight of the nitrosation-sulfitation product (on the basis of a carbon content of 17.5%). Owing to the fact that the nitrosation-sulfitation products are mixtures of many different compounds and may vary individually, depending upon the specific unsaturated organic compounds employed as starting materials and the specific conditions under which they are prepared, and further because the amounts of inorganic salts present in commercial forms thereof may vary, the proportion of organic sulfonates in a particular nitrosation-sulfitation product is conveniently defined in terms of per cent of carbon present in the product. For purposes of comparison, a product containing 17.5% of carbon will be employed herein as the standard; but it will be understood that the invention is not limited thereto, and includes various nitrosation-sulfitation products.

A preferred form of the present invention comprises nitrosation-sulfitation products having carbon contents within the range 10 to 30 carbon atoms, and especially 12 to 23 carbon atoms, and comprising mixtures of organic sulfonates including sulfonated ketones, sulfonated amines, sulfonated alkylidene sulfomates, sulfonated sulfamates and bisulfite addition products of sulfonated alkylidene sulfamates in the form of salts, especially alkali metal and ammonium salts, which have been produced from an unsaturated organic compound, more especially from a carboxyl-substituted unsaturated hydrocarbon or from an olefin hydrocarbon or from a mixture of olefin hydrocarbons obtained from petroleum, having at least one non-aromatic

linkage and a carbon content within the range 10 to 30 carbon atoms, more especially 12 to 23 carbon atoms, by a process involving reaction of a nitrosating agent (for example, NOCl, NOBr, N₂O₄ or N₂O₃) with a non-aromatic

linkage of said unsaturated organic compound and reaction of the resulting nitrosation product with a sulfite, especially an alkali metal or ammonium sulfite.

The unsaturated organic compounds employed as intermediates for the nitrosation products include the classes of compounds disclosed in the above-mentioned Beckham Patents 2,265,993, 2,313,719, and 2,336,387. Thus, they include organic compounds having 10 to 30 carbon atoms and having at least one non-aromatic

linkage. More particularly they include olefin hydrocarbons as well as carboxyl derivatives thereof, comprising free carboxylic acids, their esters, salts, amides, chlorides, and the corresponding nitriles. Starting materials especially adapted for the manufacture of products destined for use as detergents, wetting agents, and the like are compounds having 10 to 30 carbon atoms per ethylenic linkage, of which at least 8 of the carbon atoms are disposed in a continuous carbon chain. Of the olefin hydrocarbons, monoolefins having a carbon content which lies within the range 12 to 23 carbon atoms are especially suitable for the manufacture of cleansing agents. (It is to be understood that, where ranges are given herein, they include the limits.) The olefins at the lower end of this range excel in wetting power, the intermediate members excel as low temperature washing agents, and the higher olefin derivatives excel as high temperature washing agents. The use of mixtures comprising olefins of different chain length within the aforesaid range is advantageous; the presence, in a single surface-active composition, of various compounds primarily suitable respectively as wetting agents, as foaming agents, and as dispersing agents results in optimum cleaning power, since wetting is accelerated, the soil is retained in suspension, and cleansing is expedited.

The unsaturated organic compounds serving as raw materials may be straight-chain compounds, or secondary or tertiary branched-chain compounds. They may contain one or more, especially one to two, non-aromatic

linkages per molecule. The double bonds may be located at terminal or intermediate positions in the carbon chains. The most valuable compounds for detergent purposes are obtained from olefins and carboxyl-substituted olefins containing an olefinic linkage at the end of a carbon chain of at least 8 carbon atoms.

The source of the unsaturated organic compounds may be animal, vegetable, or mineral. Thus suitable olefins may be prepared by dehydrating alcohols obtained by hydrogenation of naturally occurring fats and oils (such as tallow, palm oil, cocoanut oil, olive oil), or the corresponding free acids. Or the olefins may be prepared by the Fischer-Tropsch synthesis, or by cracking waxes, or by cracking or dehydrogenating natural or synthetic (Fischer-Tropsch) petroleum or petroleum fractions, or by halogenating and then dehydrohalogenating such materials, or by polymerizing low molecular weight olefins.

Olefinic mixtures containing olefins and saturated hydrocarbons, derived from natural or syntheic (Fischer-Tropsch) petroleum directly or by thermolytic treatments thereof, constitute highly satisfactory initial materials for use in accordance with the present invention. Thermolytic treatments which have been found to yield large proportions of the desired olefins are catalytic and non-catalytic cracking, catalytic dehydrogenation, and combinations thereof. The preferred olefinic mixtures, comprising for the most part hydrocarbons having 10 to 30 carbon atoms per molecule, may be segregated from less desirable products of the treatment by fractional distillation. Since paraffinic, aromatic or saturated alicyclic hydrocarbons or other relatively inert diluent liquids, especially liquids which are solvents for the olefin or olefins being reacted, may be present during formation of the nitrosation products, non-olefinic hydrocarbons present in such thermolytic-processed petroleum distillate fractions may be permitted to remain, and may be separated after the sulfitation treatment as water-insoluble oils. The petroleum may be fractionally distilled prior to the thermolytic treatment, to provide an oil containing an increased proportion of the hydrocarbons containing 10 and more carbon atoms per molecule. Saturated aromatic constituents, to the extent they are acted upon by the nitrosating agents, form active products which may be converted by aqueous sulfites and bisulfites to water-soluble surface-active products.

Examples of suitable olefins are cetene (derived from spermaceti and comprising for the most part cetene-1), 2-methyl-pentadecene-2, dodecene-1, pentadecene-7, tricosene-11, nondecene-9, 10-methyl nondecene-9, and olefin-containing $C_{16}$-$C_{23}$ mixtures obtained by cracking topped, crude, natural or synthetic petroleum or by dehydrogenating a petroleum distillate (such as, gas oil) or by reacting carbon monoxide and hydrogen in the presence of a catalyst such as cobalt (the Fischer-Tropsch synthesis). Some synthetic petroleums contain relatively high proportions of olefins as compared with natural petroleum and hence are more suitable for use without a concentration or thermolysis to increase the olefin content.

Suitable substituted olefins are esters of unsaturated fatty acids (such as, acrylic acid and oleic acid), mono- and di-esters of maleic acid, or mixtures such as the alkenyl succinic acid esters obtained by condensation of maleic anhydride with olefin fractions obtained by cracking or dehydrogenating natural or synthetic petroleum or by catalytic processes (such as the Fischer-Tropsch synthesis) and esterification of the unsaturated dicarboxylic acid anhydrides formed, with saturated mono-, di-, or trihydroxy alcohols (such as methanol, ethanol, propanol, isopropanol, the butanols and pentanols, glycol and glycerin and their homologs, lauryl alcohol, myristyl alcohol and cetyl alcohol); the esters of saturated fatty acids (such as acetic, lauric and stearic acids) with unsaturated alcohols (such as allyl alcohol and its homologs); the mono-esters and the symmetrical and unsymmetrical di-esters of succinic acid with unsaturated alcohols, or with an unsaturated alcohol on the one hand and a saturated alcohol on the other; the free oleic and alkenyl succinic acids and their alkali-metal salts and acid chlorides; the amides of saturated fatty acids and unsaturated amines; the amides of unsaturated fatty acids and amines (e. g., dimethyl amine, methyl butyl amine, ethyl butyl amine, etc.); and unsaturated ketones.

Specific examples of substituted olefins are butyl oleate, oleic acid, methyl oleate, isopropyl oleate, allyl stearate, allyl laurate, the di-n-octyl ester of octenyl (or nonenyl, decenyl, or undecenyl)-succinic acid, oleic acid amide, N-methyl oleic acid amide, N-dimethyl oleic acid amide, oleic acid anhydride, oleic acid chloride, oleic acid nitrile, N-allyl lauric acid amide, N-oleyl butyric acid amide, N-methyl N-oleyl propionic acid amide, N-ethyl N-oleyl acetic acid amide, N-methyl N-lauryl 4-hexenoic acid amide, N-decyl 3-pentenoic acid amide, 3-methyl-4-dimethyl-cyclopentane-1-carboxylic acid ester of allyl alcohol, and oleone.

Examples of suitable unsaturated ring compounds are N-lauryl cyclohexene and $\Delta^2$-3-methyl-4 - dimethyl-cyclopentene - 1 - carboxylic acid ester of butanol-1.

Alkylbenzyl quaternary ammonium salts for use in connection with the present invention can be readily prepared by reacting a tertiary amine containing from 3 to 6 carbon atoms with an alkylbenzyl halide having 3 to 7 carbon atoms in the alkyl group or with a mixture of alkylbenzyl halides of such type. Examples of such amines are trimethyl amine, triethyl amine, methyl diethylamine, ethyl dimethylamine, ethyl methyl propylamine, pyridine, alpha-picoline, beta-picoline, and gamma-picoline.

The alkylbenzyl halides can be obtained in a simple manner by reacting the corresponding alkylbenzenes with formaldehyde (as such, or in the form of formalin, paraformaldehyde, etc.) and a hydrogen halide (e. g., hydrogen chloride or hydrogen bromide) in the presence of a dehydration catalyst (especially anhydrous zinc chloride) and, after removing the exhausted catalyst and sludge from the crude condensation product, vacuum distilling the product and recovering the fraction of distillate comprising the alkylbenzyl halide.

Advantageous alkylbenzenes for use in the preparation of alkylbenzyl compounds of the above type are those obtained by condensing olefin mixtures derived from the sources described above, but having an average carbon content of 3 to 7 carbon atoms per molecule, with benzene. The condensation is preferably carried out with a large molecular excess of benzene (e. g., about 10 mols of benzene per mol of olefin) and with the aid of anhydrous aluminum chloride.

Thus, an olefin fraction of boiling range corresponding with the desired carbon content, obtained by cracking petroleum or a petroleum distillate and fractionating, is added over a 6-hour period to a stirred mixture of benzene and aluminum chloride held at 30° to 35° C. Agitation is continued for an additional hour; the mixture is then allowed to settle, and the lower, catalyst phase is removed. The crude alkyl benzene mixture is washed free of catalyst with 5% aqueous hydrochloric acid and then with water. The washed product is distilled. After removal of unreacted paraffinic material and excess benzene, the alkyl benzene fraction is collected as condensate, leaving behind a tarry residue.

The present invention thus makes possible the combination, in a single, superior, surface-active product, of a nitrosation-sulfitation product derived from higher olefins of cracked petroleum distillates, with an alkylbenzyl pyridinium salt derived from lower olefins of the same cracked petroleum distillates.

The cation-active organic compounds can be mixed with the nitrosation-sulfitation products in various ways. Thus, they may be mixed in the solid form; or they may be dissolved or suspended in a solvent or suspension medium and dried together; or they may be added separately to the solution, bath or other treating liquid in which they are to be employed.

When employing amines as the cation-active organic compounds, they may be employed in the form of the free amines or amine salts. In either case, under normal conditions of use in aqueous solutions, the resulting aqueous mixtures contain the amine partly as the free amine and partly as the salt, owing to hydrolysis thereof and of the nitrosation-sulfitation product.

The invention will be illustrated by the following specific examples in which parts are by weight, temperatures are in degrees centigrade, and pressures are in mm. of mercury.

EXAMPLE 1

*Part A—Preparation of nitrosation-sulfitation products.*—A nitrosation-sulfitation product of the type disclosed in U. S. Patent 2,265,993 was prepared as follows: 357 parts of a cracked petrolatum fraction composed mainly of hydrocarbons containing from 14 to 23 carbon atoms (with 7.2% of higher molecular hydrocarbons), the average carbon content of the olefins contained therein being 15.9 carbon atoms per molecule and the mixture including the molecular equivalent of 62.2% of mono-olefins, were gradually mixed over the course of 6 hours with 1.24 parts (1.9 mols) of liquid nitrosyl chloride and the mixture was agitated and cooled to maintain the temperature below 30°. Upon completion of the reaction, the liquid mixture was aerated to remove unreacted nitrosyl chloride, and insoluble gum which was formed by the reaction was allowed to settle. The liquid portion of the reaction was decanted and mixed with an aqueous solution containing a mixture of sodium bisulfite and sodium sulfite in a molar ratio of 1 to 5, prepared by dissolving 400 parts (3.85 mols) of sodium bisulfite (NaHSO₃) and 170 parts (1.6 mols) of sodium carbonate in 900 parts of water and 138 parts of isopropyl alcohol. The mixture was boiled under reflux with agitation at a temperature of about 82° for about 8 hours. It was then cooled and allowed to stand quiescent until it separated into two layers. The aqueous layer was separated from the oily layer, the pH of the aqueous layer was adjusted to 8.0 with sodium carbonate, and residual hydrocarbons emulsified within the aqueous mass were removed by extracting at 40° to 50° with about twice its volume of a heptane fraction of petroleum. The isopropyl alcohol was removed from the extracted aqueous solution by distillation. The composition of the aqueous solution was adjusted by addition of the necessary quantity of sodium sulfate so as to yield, on evaporation to dryness, a mixture having a concentration of organic compounds such that the total mixture contained 17.5% carbon. The solution was then evaporated to dryness on a drum drier.

When tested for wetting action by the Draves-Clarkson method at 50° in distilled water using a 3-gram hook, the results were as set out below in Table I.

*Part B—Preparation of hexylbenzyl pyridinium chloride.*—102 parts of a hexene fraction of cracked petrolatum, boiling within the range 40° to 75° at atmospheric pressure and containing 0.98 mol of olefin per 100 parts, were added over the course of 6 hours to a mixture of 780 parts (10 mols) of benzene and 20 parts (0.15 mol) of anhydrous aluminum chloride, while vigorously stirring the reaction mixture. Stirring was continued for an additional quarter hour and the mass was allowed to stand quiescent. The upper, hexylbenzene layer was separated from the lower sludge layer, washed with 5% hydrochloric acid and then with water, dried, and fractionally distilled under vacuum, and a fraction was separately collected over the range 55° to 105° at 3 mm. pressure.

162 parts (one mol) of crude monohexylbenzene obtained in this manner were mixed with 30 parts of paraformaldehyde (one mol of formaldehyde) and 27.3 parts (0.2 mol) of anhydrous zinc chloride, and while stirring, anhydrous hydrogen chloride was bubbled through the mixture at the rate of 36.5 parts (one mol) per hour, for 7 hours while maintaining the temperature at about 50°. The reaction mixture was allowed to stand quiescent, whereupon it separated into two layers. The upper layer, comprising crude monohexylbenzyl chloride, was fractionally distilled under vacuum, and the fraction comprising the hexylbenzyl chloride was separately collected over the range 65° to 135° at 1 mm. pressure.

210.5 parts (one mol) of monohexylbenzyl chloride obtained in this manner were mixed with 87 parts (1.1 mols) of pyridine and the mixture was allowed to stand for 46½ hours at a temperature of 40° to 70°. The resulting product was employed in the form thus produced. It contained 89% of monohexylbenzl pyridinium chloride having the following general formula:

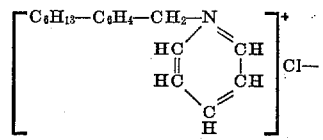

When tested for wetting action by the Draves-Clarkson method at 50° in distilled water using a 3-gram hook, a concentration of over 5 grams per liter was required for 25-second wetting. At 5 grams per liter the wetting time was over 6 minutes.

If desired, the product can be purified by heating to 100° and reducing the pressure to about 20 mm. while removing volatile material (mostly residual pyridine, hydrogen chloride and water).

*Part C—Surface-active mixtures.*—The monohexylbenzyl pyridinium chloride of Part B, above, was mixed in various amounts with the nitrosation-sulfitation product of Part A, above, to form surface-active mixtures. The proportions are set out in the following Table I. When tested for wetting action by the Draves-Clarkson method, the mixtures were found to have greatly increased wetting action, as shown by the following Table I.

TABLE I

| Nitrosation-sulfitation product, parts | Monohexyl-benzyl pyridinium chloride, parts | Draves-Clarkson test—50° C. —distilled water | |
|---|---|---|---|
| | | grams per liter for wetting in 25 sec. | Wetting time at 20 g./l., seconds |
| 100 | 0 | 8.6 | 14.8 |
| 99 | 1 | 4.1 | 7.8 |
| 95 | 5 | 2.0 | 2.3 |
| 90 | 10 | 2.1 | 4.0 |
| 80 | 20 | 1.9 | 3.0 |

It will be noted that the increased wetting effect produced by the replacement of a part of the nitrosation-sulfitation product with the hexylbenzyl pyridinium chloride reaches a maximum at about 5% of the latter.

The wool washing ability of the mixtures was tested in the following manner:

Bleached and carbonized wool flannel, cut into strips 75 x 150 mm., was soiled in a mixture of carbon tetrachloride, lubricating oil, vegetable shortening and lamp-black. The carbon tetrachloride was allowed to evaporate and the dry soiled cloth was cut into swatches 37 x 37 mm. The amount of light transmitted by the unsoiled cloth and by the soiled cloth was measured in an instrument for measuring transmitted light. The scale was adjusted to give a zero reading for no light transmission and a reading of 100 for total light transmitted by the unsoiled cloth. The degree of soil was such that the reading of light transmission of the soiled cloth was in the range 10 to 15. In carrying out the washing tests, a soiled swatch was washed at 48° in a Launder-Ometer for five minutes in 100 ml. of the solution undergoing test, contained in a pint jar, 40 Monel metal balls being employed for agitation. Duplicate tests were carried out at concentrations of 0.1, 0.141, 0.2, 0.283 and 0.4 per cent of the product tested. After washing, rinsing, and drying over night, the light transmission of the washed swatches was again measured and the difference in light transmission before and after washing was calculated for each swatch. The values for the five concentrations were averaged and the average value represents the "brightness increase" value of the product tested.

The results of the wool-washing tests in soft water and in water of 400 parts per million hardness are set out in the following Table II.

TABLE II

| Nitrosation-sulfitation product, parts | Monohexyl-benzyl pyridinium chloride, parts | Brightness increase | |
|---|---|---|---|
| | | Soft water | Hard water |
| 100 | 0 | 7 | |
| 95 | 5 | 31.2 | 41.1 |

EXAMPLE 2

Monoamylbenzyl pyridinium chloride was prepared in a manner similar to that described in above Example 1, Part B, from a cracked petrolatum fraction boiling within the range 20° to 45° at atmospheric pressure. When tested for wetting action in the above manner, a concentration of much more than 5 grams per liter was required for 25-second wetting, and at 5 grams per liter the wetting time was over 6 minutes. One part of the resulting amylbenzyl pyridinium chloride was mixed with 99 parts of the nitrosation-sulfitation product of Example I, Part A, above. When subjected to the Draves-Clarkson wetting test in the manner set forth above, a concentration of 5 grams per liter was required for 25-second wetting, and at 20 grams per liter the wetting time was 9.9 seconds.

EXAMPLE 3

*Part A.*—A nitrosation-sulfitation product of the type disclosed in U. S. Patent 2,265,993 was prepared in a manner similar to that set out in Example 1, Part A, above, from another olefin stock produced by cracking petrolatum and composed mainly of hydrocarbons containing 14 to 23 carbon atoms per molecule.

*Part B.*—A solution was prepared by dissolving 99 parts of the resulting nitrosation-sulfitation product and one part of amylbenzyl pyridinium chloride, as produced in Example 2, in 200 parts of water. Another solution was prepared by dissolving 90 parts of the nitrosation-sulfitation product and 10 parts of the amylbenzyl pyridinium chloride in 200 parts of water. The solutions were separately dried at atmospheric pressure on a rotary drum drier. The resulting products were in the form of flakes.

When subjected to wetting and wool washing tests as set out above, the results obtained were those set out in the following Table III, wherein "NS" is the nitrosation-sulfitation product and "ABPC" is amylbenzyl pyridinium chloride.

TABLE III

| NS, parts | ABPC, parts | Draves-Clarkson test—50° C.—Distilled water | | | | Wool washing in soft water, brightness increase |
|---|---|---|---|---|---|---|
| | | Gms./liter for 25-sec. wetting | Wetting time in seconds | | | |
| | | | 20 g./l. | 10 g./l. | 5 g./l. | |
| 100 | 0 | >20 | 43 | 47 | 56 | 19.1 |
| 99 | 1 | 8.5 | 16 | 22 | 44 | 19.5 |
| 90 | 10 | 3 | 4.4 | 6.3 | 12 | 28.6 |

EXAMPLE 4

A mixture of alkylbenzyl pyridinium chlorides was prepared in a manner similar to that described in Example 1, Part B, from a cracked petrolatum fraction boiling within the range 75° to 125° at atmospheric pressure and containing 0.74 mol of olefins per 100 parts, the average carbon content of the olefins being 7 to 8 carbon atoms per molecule. When tested for wetting action in the above manner, a concentration of much more than 5 grams per liter was required for 25-second wetting, and at 5 grams per liter the wetting time was more than 6 minutes. One part of the resulting alkylbenzyl pyridinium chloride mixture was mixed with 99 parts of the nitrosation-sulfitation product of Example 1, Part A, above. When subjected to wetting tests in the manner set forth above, a concentration of 4.3 grams per liter was required for 25-second wetting, and at 20 grams per liter the wetting time was 9 seconds.

EXAMPLE 5

A nitrosation-sulfitation product prepared as described in Example 1, Part A, was mixed with n-heptyl methylamine in the proportions by weight of 95:5. The mixture and each of its components were subjected to wetting and wool washing tests as set out in Example 1 above (with the exception of the substitution of powdered coal for the lamp-black used in preparing the soiled wool cloth, and use of a washing temperature of 40° and 10 rubber balls as agitation means). The results obtained were those set out in the following Table IV, wherein "NS" is the nitrosation-sulfitation product and "HMA" heptyl methylamine:

TABLE IV

| NS, parts | HMA, parts | Draves-Clarkson test—50° C.—Distilled water | | | Wool washing, brightness increase | |
|---|---|---|---|---|---|---|
| | | Gms./liter for 25-Sec. wetting | Wetting time in seconds | | | |
| | | | 10 g./l. | 5 g./l. | Soft water | Hard water |
| 100 | 0 | 7.5 | ---- | 34 | 19.2 | 30.1 |
| 95 | 5 | 2.5 | ---- | 8 | 43.8 | 42.8 |
| 0 | 100 | 3.7 | 6 | ---- | 3.1 | —0.5 |

EXAMPLE 6

The nitrosation-sulfitation product employed in Example 5 was mixed with n-octyl pyridinium chloride in the proportions by weight of 95:5. (The octyl pyridinium chloride was prepared by reacting n-octyl chloride with pyridine in a manner similar to that described in Example 1, Part B, for the preparation of monohexylbenzyl pyridinium chloride.) When subjected to wetting and wool washing tests as set out in Example 5 above, the results obtained were those set out in the following Table V, wherein "NS" is the nitrosation-sulfitation product and "OPC" is octyl pyridinium chloride:

TABLE V

| NS, parts | OPC, parts | Draves-Clarkson test—50° C.—Distilled water | | | Wool washing, brightness increase | |
|---|---|---|---|---|---|---|
| | | Gms./liter for 25-Sec. wetting | Wetting time in seconds | | | |
| | | | 10 g./l. | 5 g./l. | Soft water | Hard water |
| 100 | 0 | 7.5 | ---- | 34 | 19.2 | 30.1 |
| 95 | 5 | 2.2 | ---- | 8 | 36.0 | 41.2 |
| 0 | 100 | >10 | >180 | ---- | -2.3 | -2.9 |

EXAMPLE 7

The nitrosation-sulfitation product employed in Example 5 was mixed with n-decyl pyridinium chloride in the proportions by weight of 95:5. (The decyl pyridinium chloride was prepared by reacting n-decyl chloride with pyridine in a manner similar to that described in Example 1, Part B, for the preparation of monohexylbenzyl pyridinium chloride.) When subjected to wetting and wool washing tests as set out in Example 5 above, the results obtained were those set out in the following Table VI, wherein "NS" is the nitrosation-sulfitation product and "DPC" is decyl pyridinium chloride:

TABLE VI

| NS, parts | DPC, parts | Draves-Clarkson test—50° C.—Distilled water | | | Wool washing, brightness increase | |
|---|---|---|---|---|---|---|
| | | Gms./liter for 25-Sec. wetting | Wetting time in seconds | | | |
| | | | 10 g./l. | 5 g./l. | Soft water | Hard water |
| 100 | 0 | 7.5 | ---- | 34 | 19.2 | 30.1 |
| 95 | 5 | 2.1 | ---- | 6 | 46.4 | 40.6 |
| 0 | 100 | >10 | >180 | ---- | -2.6 | -2.8 |

EXAMPLE 8

The nitrosation-sulfitation product employed in Example 5 was mixed with n-decyl trimethylammonium bromide in the proportions by weight of 95:5. (The n-decyl trimethylammonium bromide was prepared by reacting n-decyl bromide with trimethylamine in a manner similar to that employed in Example 1, Part B, for the preparation of monohexylbenzyl pyridinium chloride.) When subjected to wetting and wool washing tests as set out in Example 5 above, the results obtained were those set out in the following Table VII, wherein "NS" is the nitrosation-sulfitation product and "DTAB" is decyl trimethylammonium bromide:

TABLE VII

| NS, parts | DTAB, parts | Draves-Clarkson test—50° C.—Distilled Water | | Wool washing, Brightness increase | |
|---|---|---|---|---|---|
| | | Gms./liter for 25-Sec. wetting | Wetting time in seconds, 5 g./l. | Soft water | Hard water |
| 100 | 0 | 7.5 | 34 | 19.2 | 30.1 |
| 95 | 5 | 2.0 | 7 | 45.2 | 40.6 |

It will be evident to those skilled in the art that the invention is not limited to the details of the above description, and that changes can be made without departing from the scope of the present invention.

It will further be understood that all ranges set out in the claims include the limits thereof.

I claim:

1. A surface-active composition consisting essentially of (1) a major proportion by weight of salts of a mixture of acids having carbon contents within the range 10 to 30 carbon atoms, said mixture including sulfonated ketones, sulfonated amines, sulfonated alkylidene sulfamates, sulfonated sulfamates and bisulfite addition products of sulfonated alkylidene sulfamates, and being derived from an unsaturated organic compound having at least one non-aromatic

linkage and a carbon content within the range 10 to 30 carbon atoms, by a process involving reaction of a nitrosating agent with a non-aromatic

linkage of said unsaturated organic compound and reaction of the resulting nitrosation product with a sulfite, and (2) a minor proportion by weight, sufficient to enhance the surface-active properties of said salts, of a cation-active organic nitrogen compound having one nitrogen atom and a maximum total of 20 carbon atoms per molecule, of which a minimum of 6 and a maximum of 14 carbon atoms are contained in an open carbon-to-carbon chain radical attached to the nitrogen atom and of which a maximum of 6 additional carbon atoms are attached to the nitrogen atom.

2. A surface-active composition consisting essentially of (1) a major proportion by weight of sodium salts of a mixture of acids having carbon contents within the range 10 to 30 carbon atoms, said mixture including sulfonated ketones, sulfonated amines, sulfonated alkylidene sulfamates, sulfonated sulfamates and bisulfite addition products of sulfonated alkylidene sulfamates, and being derived from an unsaturated organic compound having at least one non-aromatic

linkage and a carbon content within the range 10 to 30 carbon atoms, by a process involving reaction of a nitrosating agent with a non-aromatic

linkage of said unsaturated organic compound and reaction of the resulting nitrosation product with a sodium sulfite, and (2) a minor proportion by weight, sufficient to enhance the surface-active properties of said sodium salts, of a cation-active organic nitrogen compound having one nitrogen atom and a maximum total of 20 carbon atoms per molecule, of which a minimum of 6 and a maximum of 14 carbon atoms are contained in an open carbon-to-carbon chain radical attached to the nitrogen atom and of which a maximum of 6 additional carbon atoms are attached to the nitrogen atom.

3. A surface-active composition consisting essentially of (1) a major proportion by weight of a mixture of organic sulfonates having carbon contents within the range 10 to 30 carbon atoms, said mixture of organic sulfonates including sulfonated ketones, sulfonated amines, sulfonated alkylidene sulfamates, sulfonated alkyl sulfamates and bisulfite addition products of sulfonated alkylidene sulfamates, and being derived from an olefin hydrocarbon having a carbon content within the range 10 to 30 carbon atoms, by a process involving reaction of a nitrosating agent with said olefin hydrocarbon and reaction of the resulting nitrosation product with a sulfite, and (2) a minor proportion by weight, sufficient to enhance the surface-active properties of said mixture of organic sulfonates, of a cation-active organic nitrogen compound having one nitrogen atom and a maximum total of 20 carbon atoms per molecule, of which a minimum of 6 and a maximum of 14 carbon atoms are contained in an open carbon-to-carbon chain radical attached to the nitrogen atom and of which a maximum of 6 additional carbon atoms are attached to the nitrogen atom.

4. A surface-active composition consisting essentially of 99 to 90 parts by weight of a mixture of organic sulfonates having carbon contents within the range 10 to 30 carbon atoms, said mixture of organic sulfonates including sulfonated ketones, sulfonated amines, sulfonated alkylidene sulfamates, sulfonated alkyl sulfamates and bisulfite addition products of sulfonated alkylidene sulfamates, and being derived from an olefin hydrocarbon having a carbon content within the range 10 to 30 carbon atoms, by a process involving reaction of a nitrosating agent with said olefin hydrocarbon and reaction of the resulting nitrosation product with a sulfite, and, as an agent for enhancing the surface-active properties of said mixture of organic sulfonates, 1 to 10 parts by weight of a cation-active quaternary ammonium salt having one nitrogen atom and a maximum total of 20 carbon atoms per molecule, of which a minimum of 6 and a maximum of 14 carbon atoms are contained in an open carbon-to-carbon chain radical attached to the nitrogen atom and of which a maximum of 6 additional carbon atoms are attached to the nitrogen atom.

5. A surface-active composition consisting essentially of 99 to 90 parts by weight of a mixture of organic sulfonates having carbon contents within the range 10 to 30 carbon atoms, said mixture of organic sulfonates including sulfonated ketones, sulfonated amines, sulfonate alkylidene sulfamates, sulfonated alkyl sulfamates and bisulfite addition products of sulfonated alkylidene sulfamates, and being derived from an olefin hydrocarbon having a carbon content within the range 10 to 30 carbon atoms, by a process involving reaction of a nitrosating agent with said olefin hydrocarbon and reaction of the resulting nitrosation product with a sulfite, and, as an agent for enhancing the surface-active properties of said mixture of organic sulfonates, 1 to 10 parts by weight of a cation-active quaternary ammonium salt having one nitrogen atom and a maximum total of 20 carbon atoms per molecule, of which a minimum of 8 and a maximum of 14 carbon atoms are contained in an open carbon-to-carbon chain radical attached to the nitrogen atom, and of which a maximum of 6 additional carbon atoms are attached to the nitrogen atom.

6. A surface-active composition consisting essentially of 99 to 90 parts by weight of a mixture of organic sulfonates having carbon contents within the range 10 to 30 carbon atoms, said mixture of organic sulfonates including sulfonated ketones, sulfonated amines, sulfonated alkylidene sulfamates, sulfonated alkyl sulfamates and bisulfite addition products of sulfonated alkylidene sulfamates, and being derived from an olefin hydrocarbon having a carbon content within the range 10 to 30 carbon atoms, by a process involving reaction of a nitrosating agent with said olefin hydrocarbon and reaction of the resulting nitrosation product with a sulfite, and, as an agent for enhancing the surface-active properties of said mixture of organic sulfonates, 1 to 10 parts by weight of a cation-active quaternary ammonium salt having one nitrogen atom and a maximum total of 20 carbon atoms per molecule, of which a minimum of 8 and a maximum of 14 carbon atoms are contained in an open carbon-to-carbon chain radical attached to the nitrogen atom, 8 to 10 carbon atoms being members of the chain, and of which a maximum of 6 additional carbon atoms are attached to the nitrogen atom.

7. A surface-active composition consisting essentially of (1) a major proportion by weight of a mixture of organic sulfonates having carbon contents within the range 10 to 30 carbon atoms, said mixture of organic sulfonates including sulfonated ketones, sulfonated amines, sulfonated alkylidene sulfamates, sulfonated alkyl sulfamates and bisulfite addition products of sulfonated alkylidene sulfamates, and being derived from an olefin hydrocarbon having a carbon content within the range 10 to 30 carbon atoms, by a process involving reaction of a nitrosating agent with said olefin hydrocarbon and reaction of the resulting nitrosation product with a sulfite, and (2) a minor proportion by weight, sufficient to enhance the surface-active properties of said mixture of organic sulfonates, of a cation-active alkylbenzyl pyridinium salt having 3 to 7 carbon atoms in the alkyl group.

8. A surface-active composition consisting essentially of 99 to 90 parts by weight of a mixture of open-chain organic sulfonates having carbon contents within the range 12 to 23 carbon atoms, said mixture of organic sulfonates including sulfonated ketones, sulfonated amines, sulfonated alkylidene sulfamates, sulfonated sulfamates and bisulfite addition products of sulfonated alkylidene sulfamates, and being derived from an olefin hydrocarbon having a carbon content within the range 12 to 23 carbon atoms, by a process involving reaction of a nitrosating agent with said olefin hydrocarbon and reaction of the resulting nitrosation product with a sulfite, and, as an agent for enhancing the surface-active properties of said mixture of organic sulfonates, 1 to 10 parts by weight of a cation-active alkylbenzyl quaternary ammonium halt having 3 to 7 carbon atoms in the alkyl group and a total of 13 to 20 carbon atoms per molecule.

9. A surface-active composition consisting essentially of 99 to 90 parts by weight of a mixture of open-chain organic alkali metal sulfonates having carbon contents within the range 12 to 23 carbon atoms, said mixture of organic alkali metal sulfonates including sulfonated alkyl ketones, sulfonated alkyl amines, sulfonated alkylidene sulfamates, sulfonated alkyl sulfamates and bisulfite addition products of sulfonated alkylidene sulfamates, and being derived from a mixture of mono-olefin hydrocarbons obtained from petroleum and having an average carbon content within the range 12 to 23 carbon atoms, by a process involving reaction of a nitrosating agent with said mixture of mono-olefin hydrocarbons and reaction of the resulting nitrosation product with an alkali metal sulfite, and, as an agent for enhancing the surface-active properties of said mixture of organic sulfonates, 1 to 10 parts by weight of a cation-active alkylbenzyl quaternary ammonium halide having 3 to 7 carbon atoms in the alkyl group and a total of 13 to 20 carbon atoms per molecule.

10. A surface-active composition consisting essentially of 99 to 90 parts by weight of a mixture of open-chain organic alkali metal sulfonates having carbon contents within the range 12 to 23 carbon atoms, said mixture of organic alkali metal sulfonates including sulfonated alkyl ketones, sulfonated alkyl amines, sulfonated alkylidene sulfamates, sulfonated alkyl sulfamates and bisulfite addition products of sulfonated alkylidene sulfamates, and being derived from a mixture of mono-olefin hydrocarbons obtained from petroleum and having an average carbon content within the range 12 to 23 carbon atoms, by a process involving reaction of a nitrosating agent with said mixture of mono-olefin hydrocarbons and reaction of the resulting nitrosation product with an alkali metal sulfite, and, as an agent for enhancing the surface-active properties of said mixture of organic sulfonates, 1 to 10 parts by weight of a cation-active alkylbenzyl pyridium chloride having 3 to 7 carbon atoms in the alkyl group.

11. A surface-active composition consisting essentially of 99 to 90 parts by weight of a mixture of sodium salts of a mixture of acids having carbon contents within the range 12 to 23 carbon atoms, said mixture including sulfonated alkyl ketones, sulfonated alkyl amines, sulfonated alkylidene sulfamates, sulfonated alkyl sulfamates and bisulfite addition products of sulfonated alkylidene sulfamates, and being derived from a mixture of mono-olefin hydrocarbons obtained from petroleum and having an average carbon content within the range 12 to 23 carbon atoms, by a process involving reaction of a nitrosating agent with said mixture of mono-olefin hydrcarbons and reaction of the resulting nitrosation product within a sodium sulfite, and, as an agent for enhancing the surface-active properties of said mixture of organic sulfonates, 1 to 10 parts by weight of a cation-active organic nitrogen compound having one nitrogen atom and a maximum total of 20 carbon atoms per molecule, of which a minimum of 6 and a maximum of 14 carbon atoms are contained in an open carbon-to-carbon chain radical attached to the nitrogen atom and of which a maximum of 6 additional carbon atoms are attached to the nitrogen atom.

12. A surface-active composition consisting essentially of 99 to 90 parts by weight of a mixture of sodium salts of a mixture of acids having carbon contents within the range 12 to 23 carbon atoms, said mixture including sulfonated alkyl ketones, sulfonated alkylamines, sulfonated alkylidene sulfamates, sulfonated alkyl sulfamates and bisulfite addition products of sulfonated alkylidene sulfamates, and being derived from a mixture of mono-olefin hydrocarbons obtained from petroleum and having an average carbon content within the range 12 to 23 carbon atoms, by a process involving reaction of a nitrosating agent with said mixture of mono-olefin hydrocarbons and reaction of the resulting nitrosation product with a sodium sulfite, and, as an agent for enhancing the surface-active properties of said mixture of organic sulfonates, 1 to 10 parts by weight of a cation-active alkylbenzyl pyridinium chloride having 3 to 7 carbon atoms in the alkyl group.

WILLIAM A. FESSLER.

REFERENCES CITED

The following references are of record in the file of this patent:

UNITED STATES PATENTS

| Number | Name | Date |
|---|---|---|
| 2,080,143 | Lubs | May 11, 1937 |
| 2,125,901 | Evans | Aug. 9, 1938 |
| 2,132,902 | Lenher | Oct. 11, 1938 |
| 2,176,896 | Epstein | Oct. 24, 1939 |
| 2,190,133 | Epstein | Feb. 12, 1940 |
| 2,242,224 | Bley | May 20, 1941 |